United States Patent
Williamson et al.

[11] Patent Number: 6,105,788
[45] Date of Patent: Aug. 22, 2000

[54] COMPOSITE SCREEN

[75] Inventors: Gary S. Williamson, Middletown; John J. Egan, III, Centerville, both of Ohio

[73] Assignee: Thermo Black Clawson Inc., Middletown, Ohio

[21] Appl. No.: 09/188,801

[22] Filed: Nov. 9, 1998

Related U.S. Application Data

[60] Provisional application No. 60/065,520, Nov. 12, 1997.

[51] Int. Cl.⁷ ..................................................... B01D 29/62
[52] U.S. Cl. .................... 210/489; 210/497.01; 162/368; 162/372; 428/116; 428/593; 29/896.62; 492/32
[58] Field of Search ............................... 210/488, 497.01, 210/489, 402; 162/368, 372, 357; 428/544, 593, 594, 613; 29/896.62; 492/32

[56] References Cited

U.S. PATENT DOCUMENTS

| | | |
|---|---|---|
| 690,030 | 12/1901 | Parker . |
| 1,949,998 | 3/1934 | French ........................................ 92/42 |
| 3,579,422 | 5/1971 | Minick et al. .......................... 162/314 |
| 3,747,770 | 7/1973 | Zentis ...................................... 210/402 |
| 3,773,614 | 11/1973 | Pennington ............................. 162/357 |
| 3,829,360 | 8/1974 | Holz ........................................ 162/357 |
| 3,984,044 | 10/1976 | Breton et al. ........................... 210/496 |
| 4,619,737 | 10/1986 | Holz ........................................ 162/357 |
| 4,814,081 | 3/1989 | Malinowski ............................. 210/489 |

*Primary Examiner*—Robert J. Popovics
*Attorney, Agent, or Firm*—Biebel & French

[57] ABSTRACT

A papermakers' screen basket for pressure screening of papermaking stock or for pressure filtering is formed with a support core formed with honeycomb like cells that extend radially in the direction of flow through the screen basket, and a thin covering having screening openings therethrough is supported on the inlet surface of the honeycomb cell core. The core is formed by rolling a flat section of core into the shape of a cylinder and welding the abutting ends to form a complete cylinder and then attaching a perforated or a mesh sheet-like metal covering against the core inlet surface, in which the thin sheet metal covering defines small openings, such as slots or apertures, leading into the honeycomb core, and is welded in place.

3 Claims, 4 Drawing Sheets

COMPOSITE SCREEN

CROSS-REFERENCE TO RELATED APPLICATION

This application claims the benefit of U.S. Provisional Application No. 60/065,520 filed Nov. 12, 1997, which is incorporated herein by reference.

BACKGROUND OF THE INVENTION

This invention relates to a composite screen adapted for use in pressure filters and pressure screens such as for separating solids from liquids, such as for separating cellulose used in making paper from waste water, and screens for screening impurities from or grading paper making stock.

Pressure filters with screening members, such as cylindrical screens, are used in the paper and pulp preparation industry for recovering usable paper fibers from a thin slurry or liquor containing such fibers. Such screens commonly operate within a closed pressure vessel, in which foil members rotate at relatively high speed and in close proximity to a screen inlet surface, to prevent the surface from blocking while extracting liquid through the screen and retaining the screened or material fibers at the inlet surface for discharge in a thickened condition. Typical apparatus for this purpose is the Liqui-Filter screening apparatus as sold by Thermo Black Clawson Inc., 605 Clark Street, Middletown, Ohio 45042.

Rotating foil pressure filters commonly use a generally cylindrical screen in which either the inside or the outside surface is the filtration surface. More commonly, the inside surface is the inlet surface of the screen, and one or more impulse foil members are mounted on a drum or on arms extending from a central shaft. The foil members move in close proximity to the inlet surface to maintain the pulp suspension in a fluidized condition at such surface. Such screening apparatus is a closed pressure unit, commonly operating at a pressure differential across a cylindrical screen in the range of about 30 to 40 psi.

In filtering to remove or retain cellulose fibers or the like, commonly cylindrical screens, or screen baskets as they are sometimes called, are employed with small openings or very narrow slots. Typically, small openings are drilled through a wall of thin plate material, while the material is in a flat condition. The flat plate material, after drilling, is then rolled into a cylinder and welded, and end rings welded on for strength and for support within the screening apparatus.

Typically, screen openings are formed by electron beam drilling a 5/16" thick plate material, and may be as small as 0.004" but more commonly in the range of 0.006" to 0.008" in diameter. Relatively high foil speeds are employed, such as in the range of about 5000 feet per minute or higher at the inner inlet screen surface to maintain a fluidized condition of the material at that surface for screening and/or thickening and separation.

Screen baskets, as previously described, are relatively expensive to make primarily because of the labor involved in making many very small openings through the screen wall. Thus, these baskets are disproportionately expensive compared to their size and to the cost of the overall screening apparatus. Also they are, as are all screen baskets, subject to failure and destruction by reason of metal fatigue or uncontrolled over pressurization or other factors and, in which event, a comparatively costly component can quickly become destroyed and unusable. Accordingly, there is a need for a less costly and equally effective or more effective alternative construction for screen baskets.

In the filter screening apparatus, the perforations or holes must be sufficiently small as to prevent the desired fibers from going through the holes, while permitting the liquid component to be extracted through the openings in the screen basket. Therefore, these openings must be quite small, as previously defined, so that a major portion of the paper fibers are retained.

The concepts of this invention may also be employed in the manufacture of a conventional screen basket for apparatus, as shown for example, in U.S. Pat. No. 3,849,302 in which undesirable components in a paperstock slurry are screened and eliminated from the slurry. These may be particles of dirt, trash and lump like particles that have not been fully defibered. Thus, in conventional paperstock screening, the openings in the screen are sufficiently large so as to permit the paper fibers to pass through while blocking or preventing the flow of undesirable products that may be in the paper pulp suspension. In other words, the "accepts" flow through the screen while the "rejects" move along the screen surface to an outlet. Therefore, such screens commonly have openings, either in the form of slots or holes, that are larger than those typically used in filter screens where the fiber is blocked by the filter, and such openings may be in the range of as small as 0.010" width or smaller or up to 0.030" width or larger, depending upon the particular location or function of the pressure screen, and the material being screened. Such screens are likewise subject to high stresses by reason of the pressure gradient across the screens and the rotating impulse foils that are used in close proximity to the screen surface for aiding in the screening function.

SUMMARY OF THE INVENTION

This invention is directed to an improved screen basket and method having a honeycomb construction, in which a honeycomb core forms a support for a thin screening sheet or layer on the core at the inlet surface.

A screen, such as a cylindrical screen basket, is formed employing a honeycomb core as the primary supporting structure for a thin screening sheet. The honeycomb core is provided with a plurality of substantially identical cells that extend entirely throughout the core and are oriented generally orthogonally or perpendicularly to the screening surface. The honeycomb cell cores are manufactured in a flat sheet or plate-like state and are rolled to form a cylinder of the desired diameter and the ends welded as by brazing in the rolled cylindrical condition. Supporting end rings and a perforated surface mesh or metal sheet is then suitably positioned and welded in place onto the support core.

The honeycomb core surface provides a support means by which a relatively thin screening mesh or or perforated sheet may be employed and supported under the high stress conditions that are encountered in screening baskets of the kind described while maximizing the open area under the screening sheet. The screening sheet material itself is available in thin flat sheet sections with perforations or openings therethrough in the range as small as 0.002" in diameter up to 0.010" or more for pressure filters and up to 0.030" or more for pressure screens, with satisfactory percent of open area (openness) of between about 6% to about 20% or more. If damaged, the sheet material can be removed from the core and replaced.

The composite construction is one in which a screening sheet or member is adequately supported to withstand the pressures and pulsations within a closed pressurized screening or filtering system, as described. The end rings permit the positioning of the screening basket within the screening apparatus and also contribute to the circumferential strength of the basket. It has been found that such a basket can be manufactured at a cost substantially less than the manufacturing cost of a conventional electron beam drilled basket, as described. Also, the basket uses less metal, is lighter weight, and is easier to handle than a conventional basket, and presents a lower pressure drop to the system than does a conventional screen.

It is accordingly an important object of the invention to provide a lower cost and effective screen cylinder or screen basket for a rotating foil-type screening apparatus with long life, with a renewable or replaceable screening surface and having a low pressure drop.

Another object of the invention is the provision of a screen basket employing a honeycomb structural body and a mesh or perforated sheet surface supported on the body for screening suspensions of paper making stock.

A further object of the invention is the provision of a method of making a screen cylinder or the like for use with an impulse-type pressure screen for screening papermakers' stock or for filtering paper fibers from a thin water solution, including the steps of forming a honeycomb flat core of a given thickness, and rolling said core into the shape of a cylinder by welding the abutting ends together to form a complete cylinder, and then attaching to the core, such as to the inside surface of the core, a perforated or mesh sheet metal covering against the core at such surface in which the sheet metal covering defines a plurality of small openings therethrough leading into the honeycomb core, and welding such sheet metal in place to the surface of the core.

DETAILED DESCRIPTION OF PREFERRED EMBODIMENTS

Figure 1:
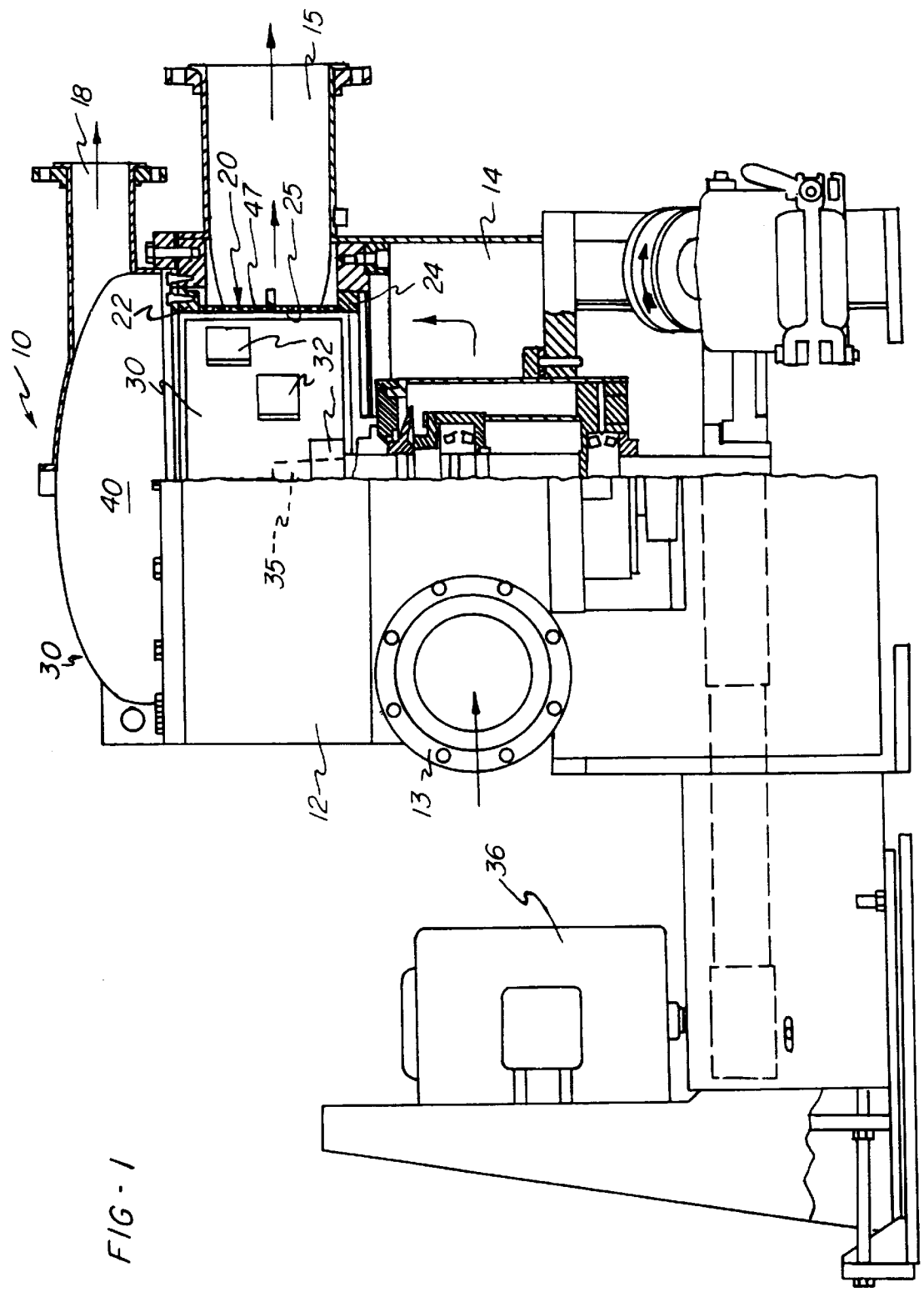
FIG. 1 is a partially cut away view of screening apparatus of the type for which the screen basket of this invention is intended.

A typical filtering or screening apparatus which employs a screen according to this invention is illustrated generally at 10 in FIG. 1. The screening apparatus 10 may be a conventional paper pulp pressure screen as shown in U.S. Pat. No. 3,849,302. The apparatus 10, as shown in FIG. 1, has an outer enclosing housing 12 which forms a pressure vessel. An inlet 13 leads into the interior of the pressure vessel into the annular space 14. When used as a pressure filter, a first outlet 15 extracts a mainly liquid content while a second and smaller outlet 18 extracts a thickened portion of the slurry or material presented to the inlet 13. A relatively low consistency stock is applied at the inlet 13 which requires thickening, or a white water discharge from a paper making machine which requires fiber removal, or similar processes.

When the apparatus 10 is used for conventional screening of pulp suspensions, for removing contaminants or particles of a given size, and for passing therethrough as accepts screened paper fibers, a higher consistency stock suspension is usually applied for greater efficiency, and the screen plate cladding, or covering, is formed with openings, such as holes or slots or combinations thereof, that have a sufficient opening size as to permit the accept fibers to pass therethrough to the outlet 15 while excluding or rejecting the undesirable material which passes to the outlet 18.

A cylindrical screen 20 is received within the apparatus 10 and separates the inlet 13 from the outlets 15 and 18. The screen 20 is usually provided with an upper flange or ring 22 and a lower flange or ring 24 by means of which the screen 20 is mounted within the screening apparatus 10. The rings 22 and 24 also add physical strength to the screen 20. Intermediate rings may also be used for added strength.

In the case of the apparatus as illustrated in FIG. 1, the inlet surface of the screen 20 is the inner surface 25 which is annular and cylindrical. Within the interior defined by the inner inlet surface 25 is a rotating foil support member with foils positioned closely adjacent the inlet surface. In this instance, the foil support member is in the form of a rotating drum 30 that has a plurality of foils 32 positioned on its outer surface. The foils 32 pass in close proximity to the inlet surface 25 as the drum is rotated. The drum is mounted on a shaft 35 in the apparatus and driven by belting by a motor 36. The motor 36 will commonly drive the drum 30 by the shaft 35 at a rate that can be as high as about 5000 feet per minute or more of surface speed at the foils 32.

Normally, the spacing between the foils 32 and the screen 20 is maintained at a minimum, so that as the drum is rotated and driven, the suspension at the inlet surface 25 is maintained in a fully fluidized condition. The spacing between the outer surface of the drum 30 in the regions between the foils 32 may be spaced from the screen surface 25 less than ½" and in some instances less than ³⁄₁₆".

The rate of flow between the inlet 13 and the outlet 15 is commonly controlled by controlling inlet and outlet gate valves, not shown. The inlet material is applied under pressure to the inlet 13 and in typical conditions, the inlet pressure may range from about 30 to 50 psi or higher.

In those instances where the screening apparatus is used as a filter to retain and separate fibers from the liquid, the filtrate is extracted through the screen and is removed through the relatively large outlet 15. Typically a 10 to 1 hydraulic split may be effected in which ⁹⁄₁₀ of the mass of the material entering the screening apparatus through the inlet 13 exits through the outlet 15, primarily as liquid, and the remaining material, approximately ¹⁄₁₀ the input does not pass through the screen but passes upwardly into the dome 40 and gathered out the outlet 18. Apparatus of the kind shown operates most efficiently with relatively low consistency inputs such as about 0.5%, for example, and with a typical 10 to 1 hydraulic split, the thickened material at the outlet 18 would have a consistency of about 5%. Dilution liquid may be added in the dome 40 as required for handling the output.

Figure 2:
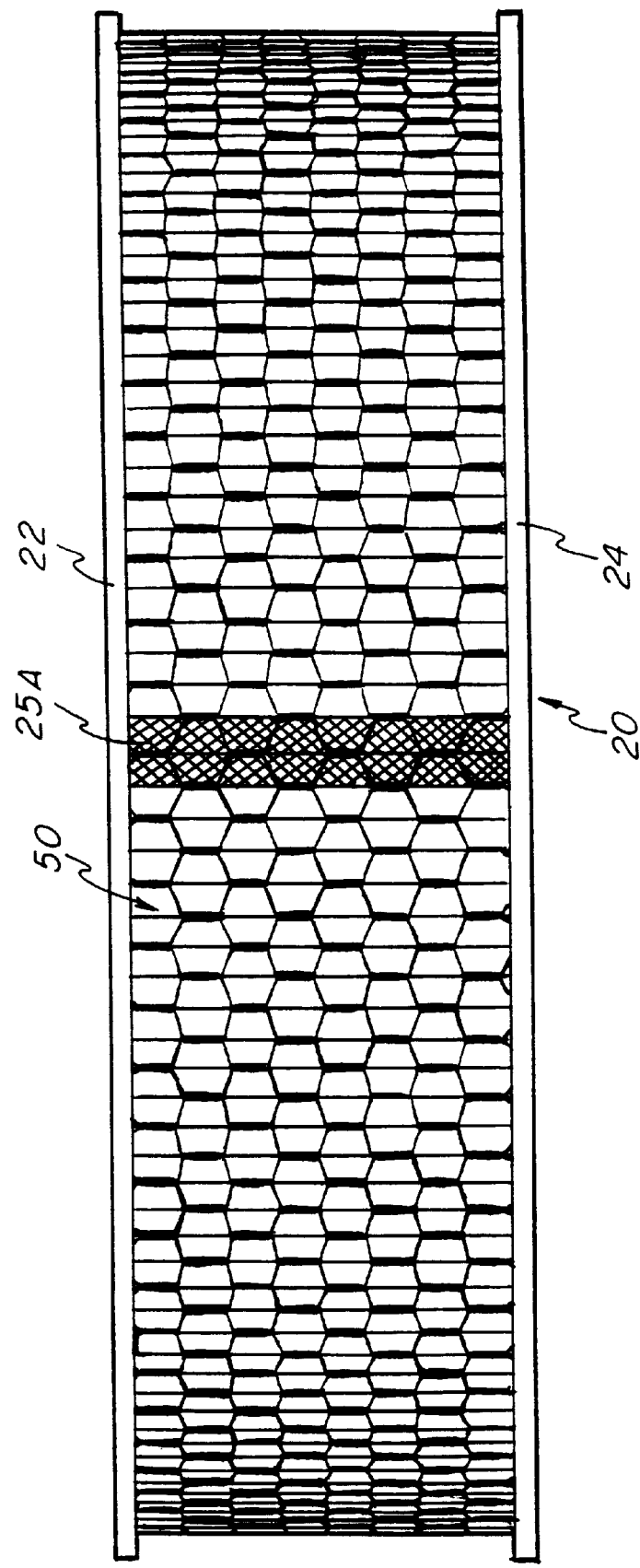
FIG. 2 is a side view of a cylindrical screen basket according to this invention.
Figure 3:
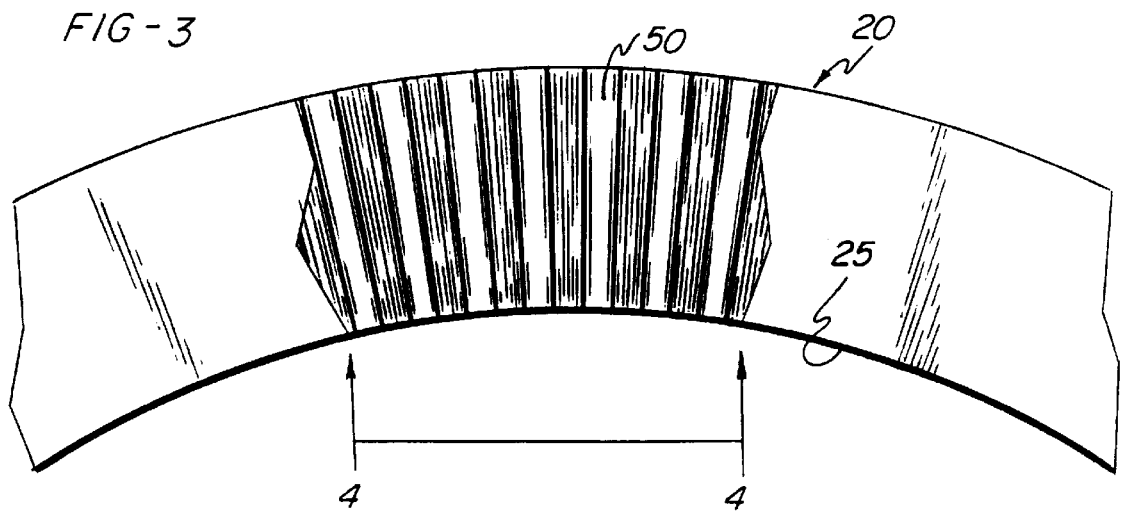
FIG. 3 is an enlarged top view of the basket of FIG. 2 with a portion being partially broken away.
Figure 4:
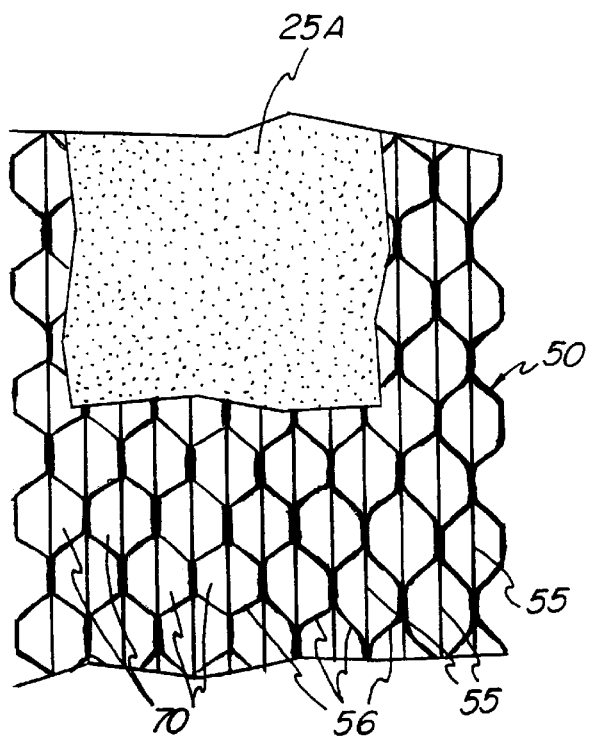
FIG. 4 is a fragmentary enlarged elevational view looking at the screen inlet surface with a portion of the perforated screen covering removed, and viewed generally along the line 4—4 of FIG. 3.

It will therefore be seen that the powered pressure impulse time type filtering or screening apparatus is highly efficient in operation but requires a screen with high strength characteristics. Therefore, in accordance with this invention, an improved screen or screen basket is made as shown in FIGS. 2–4. The core or body 50 of the screen 20 is formed as a honeycomb material, as seen in enlarged fragmentary elevation in FIG. 4. The word "honeycomb" is used herein to represent a cellular type of material in which a plurality of side-by-side cells are aligned axially parallel to each other, which cells may have three or more sides and may therefore differ from the conventional or pentagonal construction commonly thought of when referring to a honeycomb construction or shape. In fact, the construction shown in FIG. 4 may more accurately be termed or considered to be modified honeycomb configuration within the scope of this invention.

The honeycomb core 50 may thus be formed with a plurality of generally parallel support plates 55 and a plurality of diagonally zig-zagged or sinusoidal spacers 56 sandwiched between the plates 55 and welded together where they touch, thereby forming parallel cells 70. The cells may have a repetitive width, for example, of about ¼" and the height of the spacers 56 and separating plates 55, that define the thickness of the core 50, may be in the order of ¾" or more. A suitable honeycomb core construction is that which is made for supporting the aluminum skins of aircraft surfaces, such as air foils.

The inlet surface 25 is formed by a perforated or aperatured metal sheet or woven mesh covering 25A applied to the honeycomb core so that one side of the cells are open to the covering. The covering 25A may be perforated metal sheet having openings of the desired diameter or size. The perforations may be holes or slits.

The core 50 is formed in a flat condition. It is cut to a length substantially equal to the desired circumference and then rolled and brazed into the form or shape of a cylinder. The core 50 is rolled such that the support plates 55 extend parallel to the axis of the cylinder and the cells extend radially through the core. The covering 25A is inserted on the inside surface and brazed in place onto the core, and the end rings are similarly brazed or welded in place on the core. The rings may be supported on the axial ends of the core cylinders or on its outer surface or both.

The important advantage is that the construction permits the use of screening openings that are much smaller than could previously be used, by reason of the fact that the plate material or covering 25A forming the inlet surface 25 is structurally supported by the honeycomb core 50 and therefore can be much thinner than previously used. Also a higher degree of openness may be achieved. A particular advantage is the fact, if the covering 25A becomes worn or torn in service, may be removed from the relatively more expensive core 50 and replaced with new screening material, at relatively low cost. Also, a given flow rate may be achieved at lower pressure across the screen due to the higher open area of, and shorter flow path through, the screen cylinder.

The same process as described above may be used in the manufacture of a new, lightweight and stronger conventional cylinder screen for screening and sorting papermakers' stock in which the covering or plate 25A is formed with openings, such as holes or slots or combinations of these, having an effective width or diameter chosen so as to pass the good fibers, or "accepts," therethrough and to reject unwanted material, such as trash, stickies, lumps and the like. Such screens can benefit greatly from this construction in that the major structural component is a honeycomb support that has a high degree of openness, while a separating surface defined by the plate-like material 25A, can be made much thinner. In a typical screen of this type, either a filtering screen or a sorting screen, it has been found necessary to have plate thicknesses in the order of about 5/16" to provide the necessary strength. Therefore, the path that the accepts must follow to go through the screen may be as long as 5/16", or somewhat less due to the common practice of profiling the inlet surface of the screen and relieving the openings or slots of the outlet surface or both. However, such procedures require substantial metal working or machining operations, and at the same time the profiled screen surfaces inherently weaken the overall strength of the screen.

Figure 5:
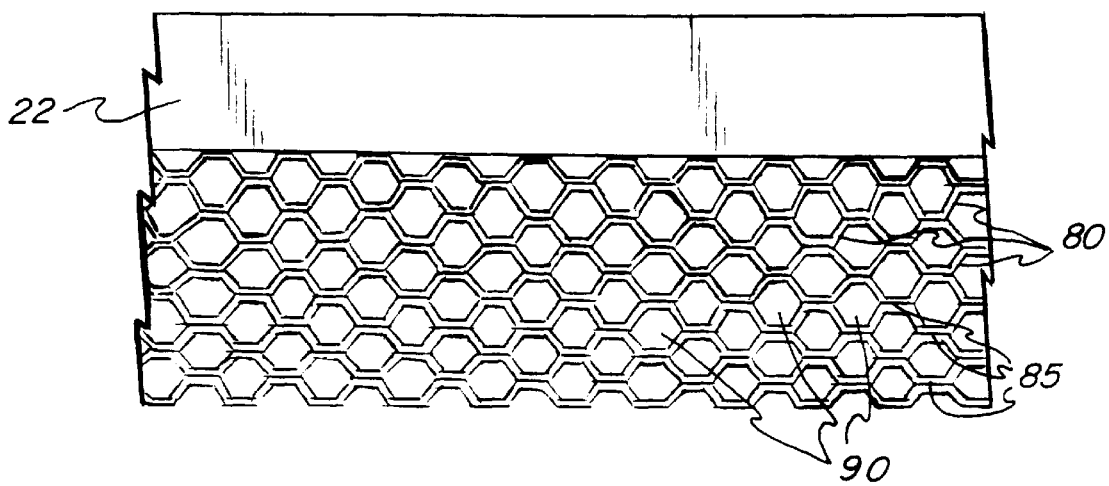
FIG. 5 is an enlarged fragmentary view of a modified honeycomb core used with this invention.

FIG. 5 represents an enlarged fragmentary view, similar to FIG. 4, with the covering 25A removed, showing a different preferred embodiment of a honeycomb core, and also showing a fragment of an end ring, such as the end ring 22. The core shown in FIG. 5 is comprised entirely of circumferentially extending corrugated sheets 80 that are formed generally sinusoidally but flattened at the points 85 of contact with adjacent sheets. The adjacent sheets are accordingly reversed from the sheet to which it is adjacent and is similarly stamped or formed with a corrugated like sinusoidal pattern of the same period as that of the other sheets, so that the apices may make contact and be flattened against each other as shown at 85, thereby defining individual cells 90 that assume a substantially sexagonal appearance, more nearly corresponding to a conventional honeycomb shape.

Further, it is within the scope of this invention to employ a screen covering 25A on the honeycomb base that is made up of a plurality of layers of thin screening material, laminated together to form a single layer. For example, individual very thin metal sheets may be screened or otherwise treated to apply a resist pattern and then acid etched to remove material not covered by the resist, to form a desired hole or aperture pattern through the thin sheet. A plurality of such individual sheets may be laminated together with apertures therein in mutual alignment to form a completed covering. By screening slightly different patterns on the individual sheets, a profile or shape may be given to the resulting openings therethrough to enhance the performance of the screen.

Figure 6:
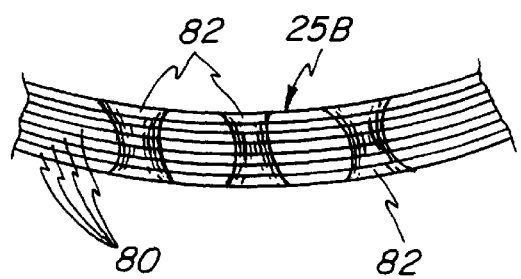
FIG. 6 is an enlarged fragmentary view of modified screen covering material.

FIG. 6 is a greatly enlarged sectional view of covering 25B that is formed as a multiple laminated layers of etched thin metal sheets 80. The individual etched sheets 80 may be made by silk screening or applying a resist pattern onto the sheet surface to define the desired shape and pattern of openings in the individual sheets, then etching to remove the material not covered by the resist, and then dissolving or washing away the resist. The sheets may be beryllium copper of 0.063" thickness or other suitable material. Such individual sheets 80 are then aligned and laminated together to form a screen covering 25B as illustrated in FIG. 5, and may be obtained from Thermoelectron-Techomet 170 New Boston Street, Woburn, Mass., 01801. The hole or opening pattern may be varied from layer to layer to create tapered, relieved or inclined openings 82 as shown in FIG. 6.

It should be understood that the screen member 25 may be positioned either on the inside surface of the core cylinder, as shown and described above, or in suitable instances, may be placed and welded to the outside surface of the screen cylinder. The latter construction is required when the completed screen cylinder is used in apparatus in which the flow of stock suspension, for screening or grading papermakers' stock, is from the outside to the inside. Also, the invention has been illustrated for the purpose of presenting preferred embodiments in which the inlet surface 25 forms a perforated screen covering 25A or 25B. A covering 25A or 25B with very small openings therethrough is preferred when the screen baskets according to this invention are used for pressure filtering, such as for recovering paper fibers from a liquid component. However, when a basket is made according to this invention for use in more conventional papermakers' screening apparatus, where the fibers themselves are the accepts and dirt, contamination, and other objects, are rejected, then oftentimes closely spaced slits or screening slots are preferred to holes, and accordingly, the screen covering may be so configured. In addition, while sheet metal or laminated sheet metals are preferred for the covering, as described above, it is not the intention to exclude fine woven mesh materials, such as used on the wires of fourdrinier machines, for example. In fact, a mesh may be preferred in some instances because of its low cost. Further, with respect to any such embodiment, the screen according to this invention may be renewed by removing a covering 25A or 25B and applying, by brazing, a new covering.

The partially finished screen cylinders may be made by following the steps of rolling the core and brazing into the cylinder or approximate cylinder form. As previously described, end rings are applied as necessary, and then put aside until a demand is required for a particular mesh screen, at which time, the screen covering or plate 25 may be added according to the desired specifications.

While the method and forms of apparatus herein described constitute preferred embodiments of this invention, it is to be understood that the invention is not limited to this precise method and forms of apparatus, and that changes may be made therein without departing from the scope of the invention which is defined in the appended claims.

What is claimed is:

1. A generally cylindrical papermakers' screen basket adapted for slurry flow therethrough in a flow direction, said screen basket comprising a support core defining a plurality of open cells with said cells extending radially in said flow direction through said screen basket, and a screen covering having openings therethrough and supported on one generally cylindrical surface of said core defining an inlet screening surface for said screen basket; said covering further comprising a plurality of thin metal sheets laminated immediately together, each of said sheets having formed therein apertures that are in general alignment with corresponding apertures of adjacent said sheets to form said openings extending entirely through said covering.

2. The screen basket of claim 1 in which the individual said apertures in said layers combine to define a shape profile of an opening through said covering.

3. A cylindrical screen basket for removing or separating particulate matter from a paper stock suspension or other liquid in pressure screening apparatus employing rotating impulse members that move in closely spaced relation to an inside screening surface of the basket comprising:

a screen-supporting generally cylindrical honeycomb core body having an inner surface, said core body also having flow through cells extending generally radially of said body;

a perforated sheet metal screen covering welded to the inner surface of said core body with the inner ends of said cells being open to the covering and to the perforations through said covering, whereby said covering forms said inside screening surface; and a pair of body encircling end rings, one each positioned at each axial end of said core body and welded to said core body for supporting said basket in such pressure screening apparatus; and said core body being formed with a plurality of generally axially extending ribs and a plurality of diagonally zig-zagged transversely extending spacers between said ribs, said spacers and said ribs together defining said cells.

* * * * *